(12) United States Patent
Redford

(10) Patent No.: US 6,678,806 B1
(45) Date of Patent: Jan. 13, 2004

(54) APPARATUS AND METHOD FOR USING TAGGED POINTERS FOR EXTRACT, INSERT AND FORMAT OPERATIONS

(75) Inventor: John L. Redford, Cambridge, MA (US)

(73) Assignee: ChipWrights Design, Inc., Newton, MA (US)

( * ) Notice: Subject to any disclaimer, the term of this patent is extended or adjusted under 35 U.S.C. 154(b) by 455 days.

(21) Appl. No.: 09/644,633

(22) Filed: Aug. 23, 2000

(51) Int. Cl.⁷ .............................................. G06F 12/00
(52) U.S. Cl. .................... 711/154; 711/119; 711/126; 711/201
(58) Field of Search ................................ 711/119, 123, 711/125, 126, 154, 201

(56) References Cited

U.S. PATENT DOCUMENTS

| | | | | |
|---|---|---|---|---|
| 4,138,720 A | * | 2/1979 | Chu et al. ..................... | 711/211 |
| 4,592,013 A | * | 5/1986 | Prame ......................... | 711/219 |
| 4,604,695 A | | 8/1986 | Widen et al. ................ | 711/217 |
| 4,679,140 A | | 7/1987 | Gotou et al. ................ | 712/229 |
| 5,224,214 A | * | 6/1993 | Rosich ......................... | 710/39 |
| 5,604,913 A | * | 2/1997 | Koyanagi et al. .............. | 712/5 |
| 6,282,623 B1 | * | 8/2001 | Halahmi et al. ............. | 711/201 |
| 6,292,879 B1 | | 9/2001 | Fong ........................... | 711/214 |

FOREIGN PATENT DOCUMENTS

| | | |
|---|---|---|
| EP | 0 552 816 A2 | 7/1993 |
| EP | 0 679 991 A1 | 11/1995 |
| EP | 0 945 783 A2 | 9/1999 |

OTHER PUBLICATIONS

Hennessey, et al., "Enhancing Vector Performance," Computer Architecture a Quantitative Approach, Second Edition, Section B5, pp. B23–B29, 1996.

* cited by examiner

*Primary Examiner*—Donald Sparks
*Assistant Examiner*—Brian R. Peugh
(74) *Attorney, Agent, or Firm*—Mills & Onello LLP

(57) ABSTRACT

An apparatus and method for processing portions of data words are described. Data words read from or written to memory are temporarily stored in a data register. Each data word is configured to include multiple portions which can be processed separately. For example, each full data word can be 32 bits long and can include four byte-long data portions. The data word is temporarily stored in a data register for processing. An address register associated with the data register temporarily stores an address word associated with the portion of the data word to be processed. The address word includes an address pointer for the portion of the data word as well as a tag. The tag includes information used to extract the portion of the data word from the data word for processing or to insert the portion of the data word into the data word after processing. The information in the tag can include the size of the data word portion being processed and its location within the data word. The tag can also identify the type of data, e.g., signed or unsigned. Thus, each portion of a data word being processed is associated with a tagged pointer to facilitate extracting and inserting the portion out of and into the associated full data word.

24 Claims, 3 Drawing Sheets

APPARATUS AND METHOD FOR USING TAGGED POINTERS FOR EXTRACT, INSERT AND FORMAT OPERATIONS

BACKGROUND OF THE INVENTION

In many systems which process large amounts of data, such as image data processing systems, large memories are required. Depending on their types and sizes, memories can be expensive. It is therefore beneficial to make the most efficient use possible of the available memory space. In many cases, it is efficient to select a memory such that the size of each memory location is larger than the data items to be stored at the locations. Multiple data items can then be stored at each location, with each data item occupying a portion of the location. When an individual data item is processed, the memory location in which it is located is accessed. The portion of the data stored at the location that includes the relevant data item is processed. The data item can be extracted from the data stored at the location for processing and inserted into the location after processing. The extraction and insertion must be performed such that the location of the appropriate portion of data within the location and other relevant information are known.

SUMMARY OF THE INVENTION

The present invention is directed to an apparatus and method for processing portions of data words stored in a memory. In accordance with the invention, at least one data register is provided for temporarily storing a data word associated with a memory location. At least one address register associated with the data register is also provided. The address register temporarily stores an address word that is associated with the particular data item or portion of the data word that is to be processed. The address word includes information related to the portion of the data word to be processed. The portion of the data word is processed using the information stored in the address register.

In one embodiment, the information stored in the address word identifies the size of the data item to be processed. The information can identify the size in terms of the number of bytes or the number of bits. For example, this information can identify the portion of the data word as being one byte long or as being eight bits long The information can also identify the position of the data item within the data word. For example, where each data word is 32 bits long and each individual portion of the data word is one byte long, the position information can identify the one of four possible locations within the data word at which the pertinent byte of data is located.

The information can also identify the type of data in the portion of the data word to facilitate processing of the data. For example, this information can identify the data as being signed or unsigned.

The approach of the invention can be used to both extract a data item from the full data word and to insert a data item into the full data word. In one embodiment, when the portion is extracted, the full data word is first read into a shifting device such as a shift register. Using the position and size information stored in the address register, the pertinent portion can be shifted into a predetermined position within the shifting device such as the least significant bit positions. Then, the portion of the data word can be read out of the shifting device. The unused bits in the shifting device can be masked such that only data bits of the relevant portion of data are read out of the shifting device.

The approach of the invention is typically used in conjunction with one or more processors or processing elements executing program instructions. In accordance with the invention, the instruction extracts one of the smaller data item fields from the larger data word and performs an operation on the extracted data item. Likewise, an instruction can insert a smaller field into the larger word at a particular position. In one embodiment, if the result of an operation is larger than the allocated partial field, the result can be truncated and shifted into the correct space within the data register.

In accordance with the invention, the insertion and extraction of the data items into and out of the full data word is performed during an instruction using the information stored in the address register. The instruction is able to process the data item using the position, bit field width (size) and type (signed or unsigned) information.

The information stored in the address register may be referred to as a tag, and the address register may be referred to as a pointer in the C programming language. The address register therefore may be referred to as a tagged pointer.

When an instruction starts, the data register and the address register are read out in parallel. The field width and position information from the address register are used to control the shifter on the data side. In one embodiment, the shifter shifts the smaller bit field containing the data item to the right so that it starts at bit position zero. The unused part of the data register can be masked off, and the data type information can be used to determine whether the data item field is to be sign extended out to the data register width (in the case of signed data) or zero extended (in the case of unsigned data). Next, all the normal operations, e.g., arithmetic operations, can be performed.

When the instruction finishes, an analogous approach can be applied to insert the result back into a data register. The address register associated with the pertinent data register supplies the position and width for the field to be inserted. The signed/unsigned information can be used to determine whether a signed or unsigned saturation operation is to be performed.

During the instruction, the address register can be incremented to point to the next small data item to be extracted from a data register. Likewise, the destination address in the address register can be incremented so that the next result is inserted into a new slot in the destination data register.

The approach of the invention can be readily applied in a single instruction stream, multiple data stream (SIMD) processing system. In such a system, a single instruction operates on multiple data items. In the context of the present inventions a single address register can specify operations on many data registers simultaneously.

The approach of the invention has numerous advantages. For example, in the approach of the invention, the shift and mask functions can be performed as part of instructions, instead of as separate instructions. This saves a considerable number of instructions and therefore increased processing throughput. Also, the function of incrementing the address register to point to a new field can be embedded within an arithmetic instruction instead of being performed as a separate instruction. Again, a significant number of instructions can be saved.

Also, using the approach of the invention, the size of a particular operation is known in advance from the address register. This can aid in expediting certain arithmetic operations. For example, a 32-by-32 multiply can take several cycles, while a 16-by-16 can by done in one.

Using the approach of the invention, data of different sizes can be mixed in one instruction, since each operand can specify a different size via its address register word. In the absence of the tag information of the invention, a separate opcode for, each combination of sizes would be required.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1:
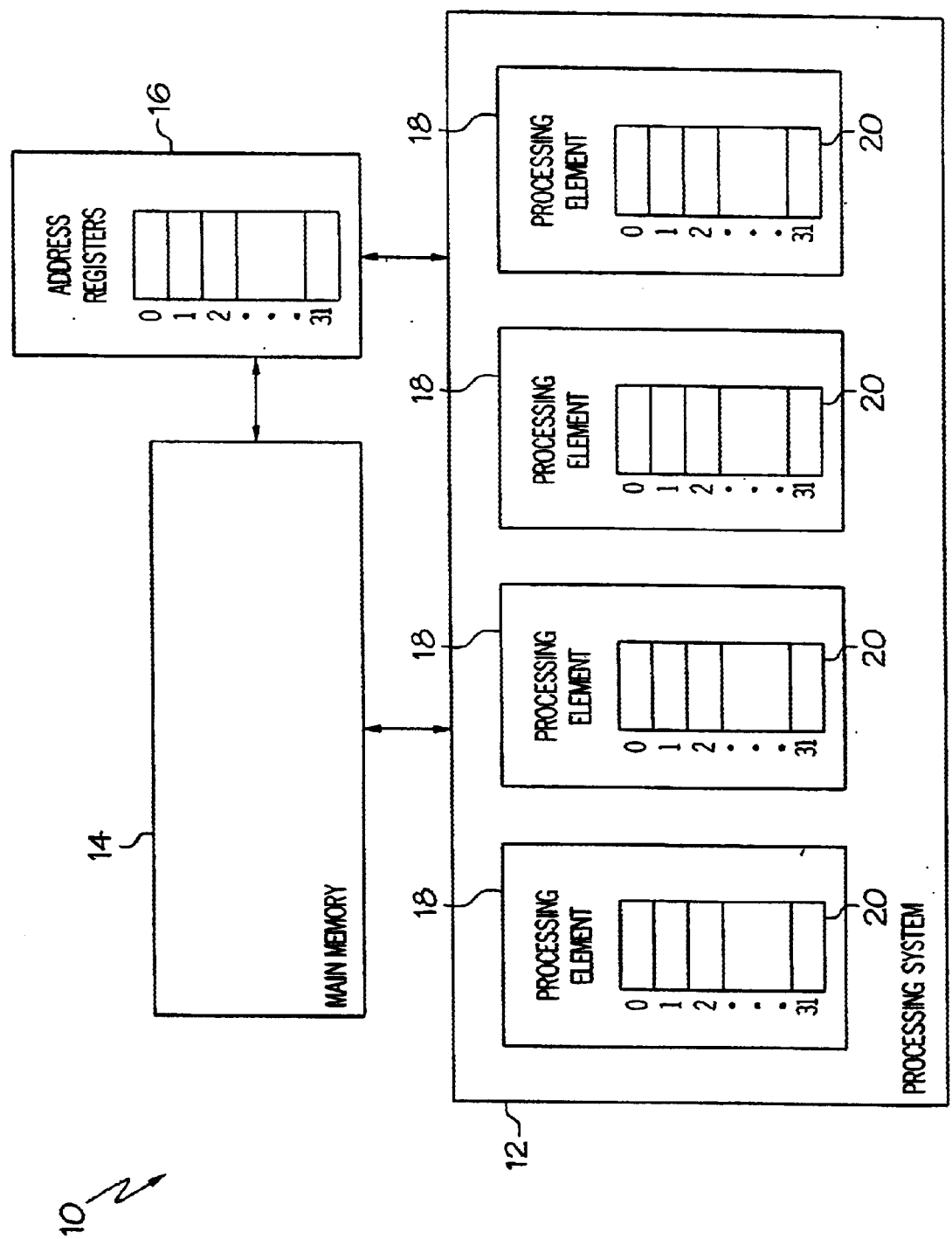
FIG. 1 is a schematic block diagram of a computer system for processing data in accordance with one embodiment of the invention.

FIG. 1 is a schematic block diagram of a computer system 10 for processing data in accordance with an embodiment of the present invention. The system 10 can be, for example, an image data processing system. The system 10 includes a processing system 12 which can include multiple processing elements 18 which can be used for simultaneously processing multiple data items in parallel. The processing system 12 is coupled to a main memory 14 via a bus. The main memory is used to store the program instructions and data used to process data in accordance with the invention. The main memory 14 and the processing system 12 are both coupled to a set of address registers 16, which store the address words including the tag information used to insert and extract individual data items into and out of full memory data words in accordance with the invention.

Each processing element 18 is associated with a respective group of data registers 20 which temporarily store data words from the main memory 14 which are to be processed during execution of a program instruction. As shown in the illustrative example of FIG. 1, each group of data registers 20 includes 32 registers. Likewise, the group of address registers 16 also includes 32 registers. Each address register is associated with a respective data register in each group of registers 18. That is, for example, address register 4 is associated with data register 4 in each group of data registers 20.

In one embodiment, the system 10 is a single instruction stream, multiple data stream (SIMD) system. Accordingly, each address register can in general specify operations on more than one data register simultaneously.

Upon execution of a program instruction in which a data item is to be extracted from a data word, an address in one of the address register words is used to identify the data word in main memory 14. The data word is written into the appropriate data register in the group of registers 18 associated with the processing element 18 that is executing the instruction. Using the tag information stored in the address register, the data word is shifted in the data register to a predetermined position such as the least significant bit positions and is read out of the register. The remainder of the word can be masked to eliminate the possibility of reading out unnecessary data. The extracted data item can then be processed in accordance with the instruction being executed. For example, arithmetic operations can be performed on the data item. The signed/unsigned information stored in the address register defines the type of arithmetic operation performed.

Following processing, the result can be inserted back into its associated data word. The result can be written into the appropriate data register and shifted into the proper position y the processing element 18 using the data item tag information in the address register.

It will be noted that the shifting and masking operations can be performed in a separate device such as a shift register. When extracting a data item, the full data word can be read out of the data register to the shift register and then shifted to extract the data item for processing. When inserting a data item, the shift register can be used to shift the item into the appropriate position, and the data item can then be written into the data register in position.

Figure 2A:
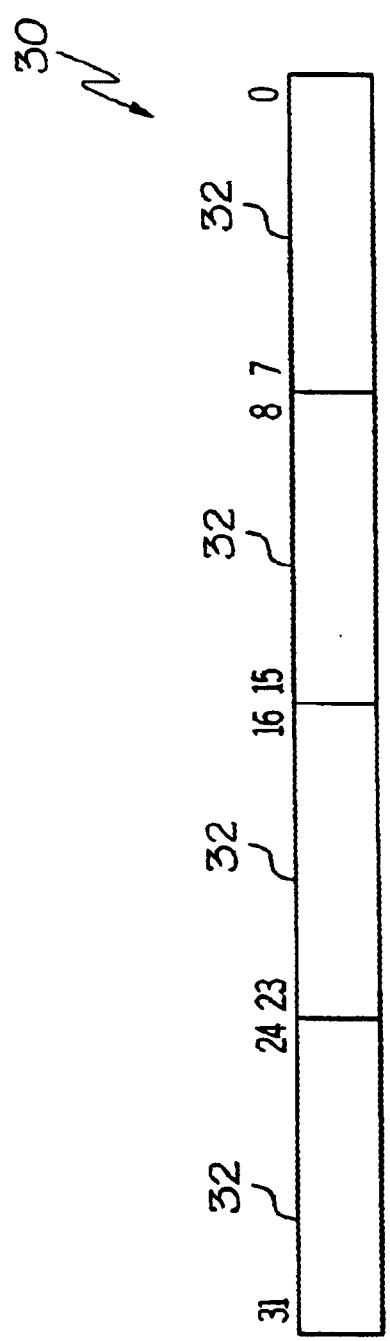
FIG. 2A is a schematic diagram illustrating fields of a full data word containing multiple data items in accordance with the invention.

FIG. 2A contains a schematic diagram of the contents of one of the data registers. As shown in FIG. 2A, a full data word 30 in the data register contains multiple data items 32 in accordance with the invention. In the example shown in FIG. 2A, the full data word 30 is 32 bits long, and each data item 32 is one byte or eight bits long. Accordingly, in one embodiment, each byte-long data item 32 can occupy one of four possible positions within the data word 30. It will be understood that other data word and data item sizes may be used in accordance with the invention.

Figure 2B:
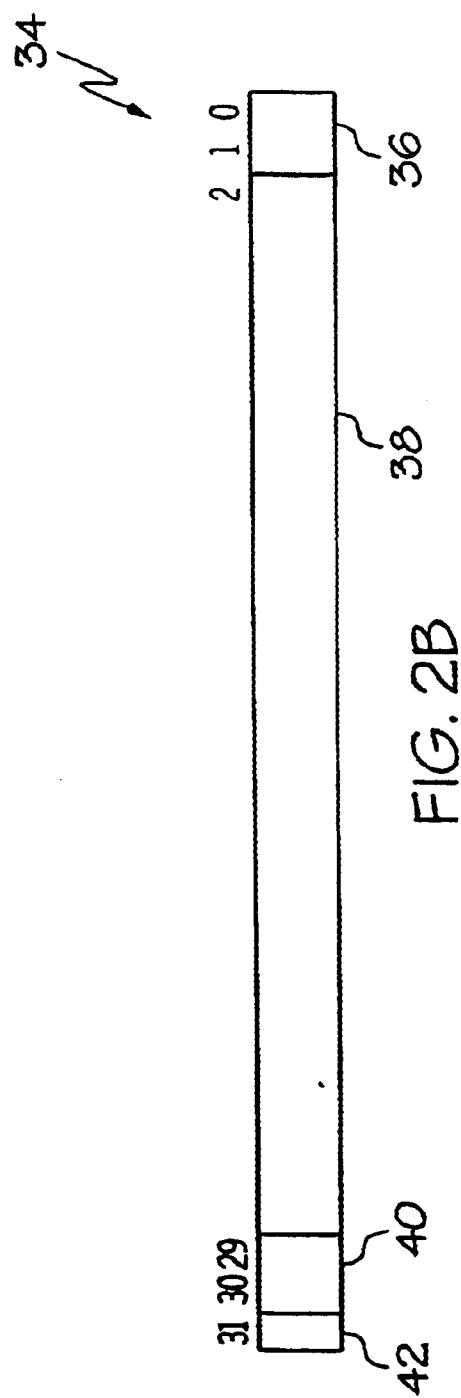
FIG. 2B is a schematic diagram illustrating fields of an address word containing information for processing an individual data items stored as a portion of a data word in accordance with the invention.

FIG. 2B is a schematic diagram illustrating the contents of one of the address registers in accordance with one exemplary embodiment of the invention. As shown in the example of FIG. 2B, the address word 34 includes four fields. An address field 38 extending from bit position 2 through 28 contains an address of the main memory 14 from which the related data item 32 is to be retrieved for processing or to which the data item 32 is to be returned after processing. The address field can therefore be regarded as a pointer in certain well-known programming languages including, for example, the C programming language.

The remaining fields 36, 40 and 42 of the address word 34 form the tag for the data item 32 being processed. Hence, the entire address word 34 can be regarded as a tagged pointer. In the embodiment of FIG. 2B, the field 36 is a position field which defines the position of the data item 32 within the full data word 30. In this particular illustration, the position field 36 is two bits long, occupying bit positions 0 and 1. The position field requires only two bits because in this illustration, the data item 32 can occupy one of only four possible positions. In another configuration, the position field could be different. For example, if each data item were sixteen bits long, then only two positions would be possible, and, therefore, only a single position bit would be required. Likewise, if each data item were four bits long, then eight positions would be possible, and three position bits would be required in the position field 36.

The tag also includes a size field 40 which is also shown in this exemplary embodiment as being two bits long. In this case, the size field occupies bit positions 29 and 30. In this case, two bits are used to accommodate at least three possible data item sizes. For example, the data item may be one byte long, two bytes long or four bytes long.

The field 42 is a type field which in this embodiment is a one-bit field which occupies bit position 31 and which defines the type of data in the data item 32. Specifically, in this configuration, the single bit in field 42 can identify the data as being signed or unsigned data. Other data types can be identified by the type field. For example, the data can be identified as being floating point data or one of multiple types of floating point data. In case such as this where several types of data can be identified, more than one bit can be used for this field.

In general, the tag fields 36, 40 and 42 can be defined and configured and their respective bits can be allocated according to the particular system and operational configuration in which the invention is being implemented. For example, the size field may require a larger number of bits to identify the size of the data item to be processed. However, in that case, there may be only one usable position within the fill data word that can be occupied by the data item. In that case, no position field is required. The position field bits can then be allocated to the size field if necessary. Or, if one of many data types is possible, the bits that would have been used as position bits can be used in the type field. As another example, where floating point data is used, there is no need for a type bit identifying whether the data is signed or unsigned, since all floating point data is signed. Thus, in this case, the type bit which would have indicated signed data can be reallocated to another function instead. Hence, the system of the invention is very flexible to handle many different functional configurations, even simultaneously within a single system.

Figure 3:
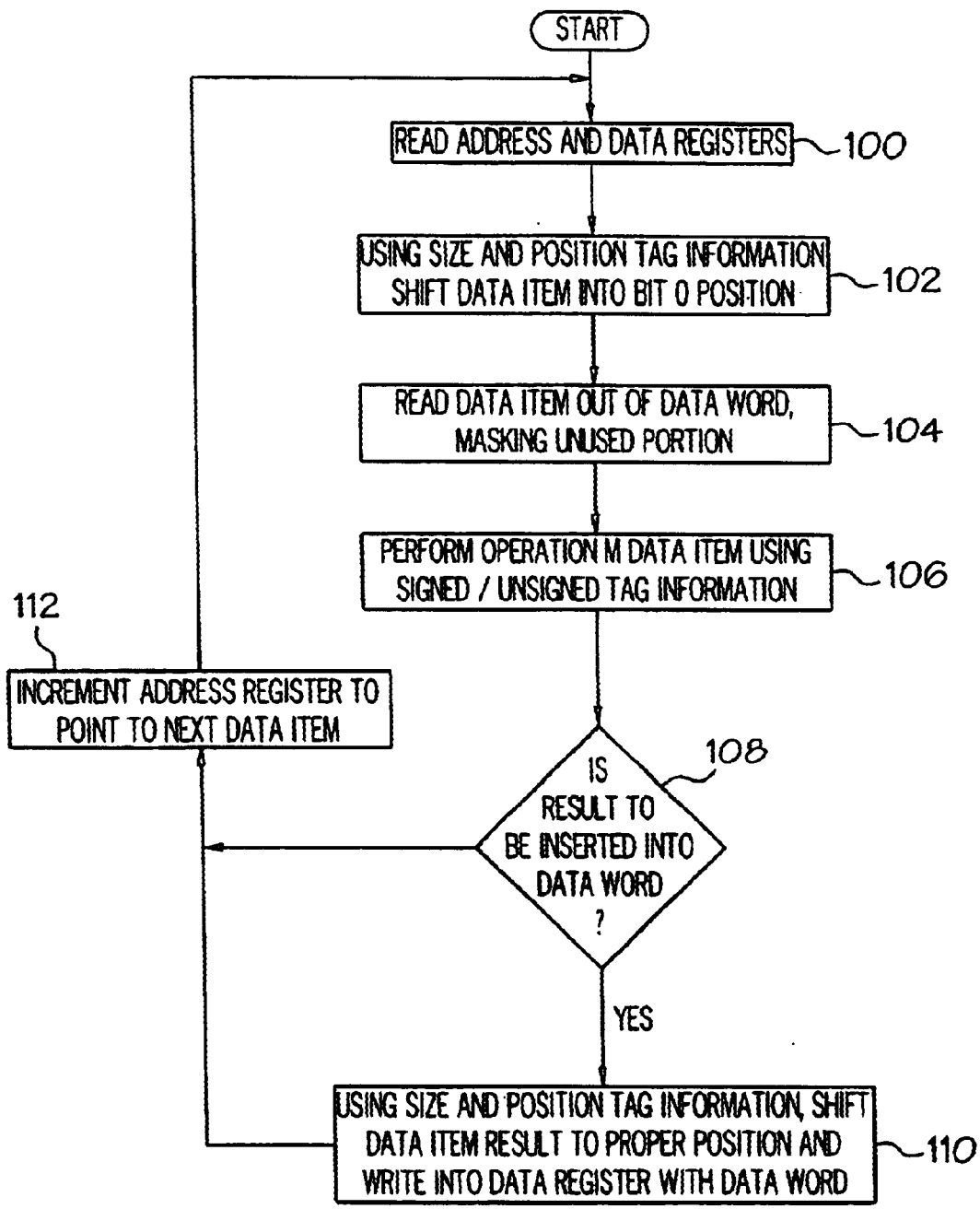
FIG. 3 contains a schematic flow chart illustrating execution of an instruction in which a data item is extracted from a data word for processing and the result of the processing is inserted as a data item within a full data word, in accordance with the invention.

FIG. 3 contains a schematic flow chart illustrating execution of an instruction in which a data item 32 is extracted from a data word 30 for processing, and the result of the processing is inserted as a data item within a full data word. It should be noted that the example flow of FIG. 3 illustrates a situation in which both an extraction and an insertion are performed. It will be understood that either function can be performed separately.

In step 100, the address and data registers for the instruction are read out in parallel. Next, in step 102, the size and position information in the address register tag fields are used to shift the addressed data item to the right such that it begins in bit position 0 of the data register word. Next, in step 104, the data item is read out of the data word while the unused portions of the data word are masked. Then, in step 106, the required operation is performed on the extracted data item. In many cases, the operation will be an arithmetic operation and, therefore, the signed/unsigned portion of the tag is used to defined the type of arithmetic performed. In one embodiment, the address register can also be incremented while the extracted data item is being processed, i.e., while an instruction is being executed.

In step 108, a determination is made as to whether the result is to be inserted back into a full data word. If so, in step 110, the resulting data item is shifted into its proper position in a shift register or in the relevant data register, using the size and position tag information contained in the address register. The complete data word is written into the data register and then into main memory.

After the insertion in step 110 or after the operation is performed in the case in which no insertion is performed, in step 112, the address register is incremented to point to the next data item to be extracted in the data register. Likewise, in the case of insertions, the destination address can be incremented so that the next result goes into a new slot in the destination data register.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A method of processing data words in a processing system comprising:
   providing at least one data register for temporarily storing a data word to be processed;
   providing at least one address register associated with the data register, the address register temporarily storing an address word associated with a portion of the data word to be processed and containing information related to the portion of the data word to be processed, said information identifying a data type of the portion of the data word; and processing the portion of the data word using the information in the address register.

2. The method of claim 1 wherein the information identifies the size of the portion of the data word.

3. The method of claim 1 wherein the information identifies a number of bits in the portion of the data word.

4. The method of claim 1 wherein the information identifies a number of bytes in the portion of the data word.

5. The method of claim 1 wherein the information identifies the position of the portion of the data word within the data word.

6. The method of claim 1 wherein the data type is one of signed and unsigned data.

7. The method of claim 1 wherein processing the portion of the data word comprises extracting the portion of the data word from the data word using the information in the address register.

8. The method of claim 7 wherein extracting the portion of the data word from the data word comprises shifting the portion of the data word into a predetermined position in the data word using the information in the address register.

9. The method of claim 7 wherein processing the portion of the data word further comprises inserting the portion of the data word into the data word to form the data word using the information in the address register.

10. The method of claim 1 wherein processing the portion of the data word comprises inserting the portion of the data word into the data word to form the data word using the information in the address register.

11. The method of claim 1 wherein the address register operates, in a SIMD configuration such that the address register is associated with a plurality of data registers such that the address register can specify an operation to be performed on a plurality of portions of data words.

12. The method of claim 1 further comprising incrementing the address register while the portion of the data word is being processed.

13. An apparatus for processing data words in a processing system comprising:
   at least one data register for temporarily storing a data word to be processed;
   at least one address register associated with the data register, the address register temporarily storing an address word associated with a portion of the data word to be processed and containing information related to the portion of the data word to be processed, said information identifying a data type of the portion of the data word; and a processor for processing the portion of the data word using the information in the address register.

14. The apparatus of claim 13 wherein the information identifies the size of the portion of the data word.

15. The apparatus of claim 13 wherein the information identifies a number of bits in the portion of the data word.

16. The apparatus of claim 13 wherein the information identifies a number of bytes in the portion of the data word.

17. The apparatus of claim 13 wherein the information identifies the position of the portion of the data word within the data word.

18. The apparatus of claim 13 wherein the data type is one of signed and unsigned data.

19. The apparatus of claim 13 wherein the processor, in processing the portion of the data word, extracts the portion of the data word from the data word using the information in the address register.

20. The apparatus of claim 19 further comprising a shifter for shifting the portion of the data word into a predetermined position in the data word using the information in the address register to extract the portion of the data word from the data word.

21. The apparatus of claim 19 wherein the processor, in processing the portion of the data word, inserts the portion of the data word into the data word to form the data word using the information in the address register.

22. The apparatus of claim 13 wherein the processor, in processing the portion of the data word, inserts the portion of the data word into the data word to form the data word using the information in the address register.

23. The apparatus of claim 13 wherein the apparatus is part of a SIMD system in which the address register is associated, with a plurality of data registers such that the address register can specify an operation to be performed on a plurality of portions of data words.

24. The apparatus of claim 13 wherein the address register is incrementable while the portion of the data word is being processed.

* * * * *